United States Patent

[11] 3,588,894

| [72] | Inventor | Michael J. Prickett<br>Santee, Calif. |
|---|---|---|
| [21] | Appl. No. | 851,685 |
| [22] | Filed | Aug. 20, 1969 |
| [45] | Patented | June 28, 1971 |
| [73] | Assignee | The United States of America as represented by the Secretary of the Navy |

[54] AUTOMATIC GAIN CONTROL SYSTEM FOR HIGH-RANGE-RESOLUTION RADAR
7 Claims, 1 Drawing Fig.

| [52] | U.S. Cl. | 343/5, 343/7, 343/17.2, 325/411 |
|---|---|---|
| [51] | Int. Cl. | G01s 9/23, H04b 1/16 |
| [50] | Field of Search | 343/5, 7 (RS), 17.2, 17.2 (PC); 325/400, 411 |

[56] References Cited
UNITED STATES PATENTS
3,303,497  2/1967  Chubb...................... 343/17.2(PC)

*Primary Examiner*—Richard A. Farley
*Assistant Examiner*—T. H. Tubbesing
*Attorneys*—Joseph C. Warfield, George J. Rubens and John W. McLaren

ABSTRACT: An automatic gain control (AGC) system for receivers used in high-range-resolution radar is disclosed. Received, very short radar echos are time-compressed by means of a microwave delay line, rectified by means of a square law detector, and stretched with respect to time by means of a sampling oscilloscope. The resultant stretched pulses are fed back through a threshold device, a pulse peak detector, and a low-pass filter to provide a control voltage to PIN diodes which function as voltage controlled attenuators in the forward signal path.

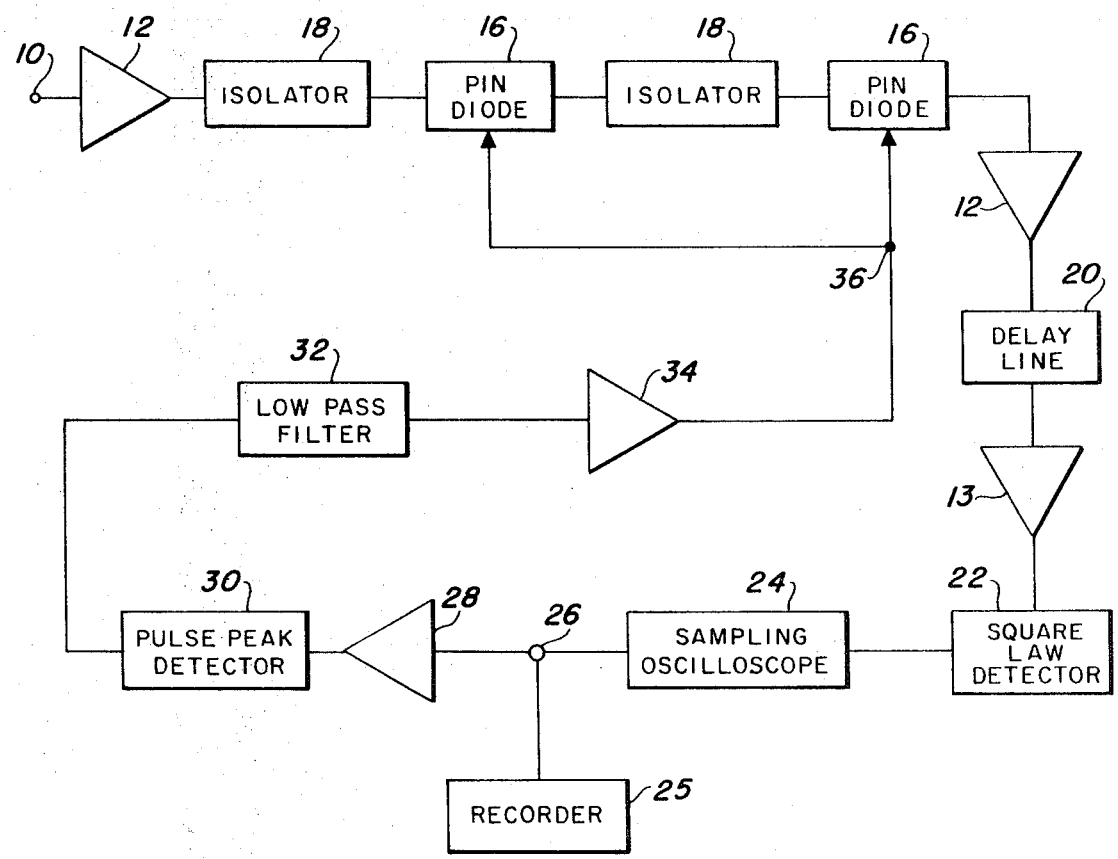
INVENTOR.
MICHAEL J. PRICKETT
BY
ATTORNEYS

AUTOMATIC GAIN CONTROL SYSTEM FOR HIGH-RANGE-RESOLUTION RADAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

With the advent of microwave dispersive delay lines, it has become possible to generate very large bandwidth radar signals at moderate to high energy levels. This capability of using wideband radar signals permits a high resolution capability of the order of 1 foot in range and hence offers many new possibilities in the measurement of radar target signal characteristics.

In a particular high-range-resolution radar developed by the Government, the transmitted signal is a linear frequency modulated (chirp) signal with a 600 Mc/s bandwidth and a 0.3 microsecond duration to produce a total time-bandwidth product of the order of 180. The received signal or echo is time-compressed by a microwave dispersive delay line from 1.2 microsecond to 2 nanoseconds to produce a total time-bandwidth produced of the order of 720.

In order to effectively process and record such short detected pulses it is necessary to normalize the signature waveform to a predetermined level without distorting the detected pulse with respect to time and shape. By normalizing the signature waveform, the radar receiver can be operated at its optimum signal level throughout the measuring range of the target.

Due to the extreme shortness of the detected pulses existing AGC circuits cannot be effectively employed in high-range-resolution radars.

SUMMARY OF THE INVENTION

The invention comprises an AGC system which is used in conjunction with high-range-resolution radar receivers. Incoming, very short radar echos are time-compressed by means of a microwave delay line known as a folded tape meander line (FTML). After being rectified, the compressed signals are stretched in time by means of sampling oscilloscope. The resultant stretched pulses, or signature waveforms, are fed back to the input signal path as a control voltage through a threshold device and a pulse peak detector to PIN diodes which function as voltage controlled attenuators in the input signal path.

The AGC system eliminates the requirement for manual control of the radar receiver gain and also normalizes the peak of the detected signal to produce a constant voltage without distorting of the waveform with respect to shape and time. Thus the AGC system permits operation of the radar receiver at its optimum signal level throughout the measuring range of the target and makes possible more effective processing of the detected radar signals.

STATEMENT OF THE OBJECTS OF THE INVENTION

An object of the present invention is to provide an automatic gain control circuit for a high-range-resolution radar system.

Another object of the present invention is to provide an automatic gain control circuit that can be used with very short radar pulses.

Another object of the present invention is to provide an automatic gain control circuit that normalizes the signature waveform of a very short radar pulse to a predetermined voltage level without distorting the input waveform with respect to shape and time.

Other objects and many of the attendant advantages of this invention will be readily appreciated as the same becomes better understood by reference to the following detailed description of a preferred embodiment when considered in connection with the accompanying drawing.

BRIEF DESCRIPTION OF THE DRAWING

The drawing is a schematic block diagram of the AGC system of the present invention.

DESCRIPTION OF THE PRINCIPAL EMBODIMENT

In the drawing, a radar signal input terminal 10 is electrically coupled to the input of a first RF amplifier 12. The output of RF amplifier 12 is electrically coupled to a first PIN diode 16 through a first isolator 18. The output of the first PIN diode 16 is likewise coupled to a second PIN diode 16 through a second isolator 18.

The output of the second PIN diode 16 is connected to the input of a second RF amplifier 12. The output of the second RF amplifier 12 is coupled to a delay line 20. The output of delay line 20 is connected to the input of a video or pulse amplifier 13. The output of amplifier 13 is coupled to a square law detector 22. The output of square law detector 22 is applied to a sample scope 24. The output of sampling oscilloscope 24 is derived at the vertical output terminal 26 and is referred to as the signature waveform of a radar target.

The output of sample scope 24 is coupled to the input of threshold and pulse amplifier 28 and to a recorder 25. The output of amplifier 28 is connected to a low-pass filter 32. The output of low-pass filter 32 is connected to the input of current amplifier 34. The output of the current amplifier 34 is connected to the PIN diodes 16.

OPERATION

In operation, the transmitted signal can typically be a linear FM chirp having, for example, a 600 mHz. bandwidth and a 0.3 microsecond duration. The radar echo is received at the input terminal 10. The echo is amplified by a first RF amplifier 12. The amplified echo is then coupled to the two serially connected PIN diodes 16 which function as microwave attenuators for the input signal. Since PIN diode attenuation varies nonlinearly with signal frequency at higher levels of bias current, it is necessary to use two PIN diodes in series as shown in the drawing to obviate this difficulty. The isolators 18 function to prevent the input signal from being reflected back to the input terminal 10 due to impedance mismatch between the diodes 18 and the transmission line.

The attenuated output of PIN diodes 16 is amplified in a second amplifier 12. The output of amplifier 12 is then coupled to a microwave dispersive delay line 20. In essence delay line 20 accepts a well-defined chirp signal as an input and operates upon it to compress it with respect to time, to produce a discrete pulse. In a typical preferred embodiment, delay line 20 may comprise a folded tape meander line (FTML). The FTML consists of a conductive tape of copper or silver that has been immersed in a solid dielectric and folded back and forth on itself. The coupling coefficient between turns is controlled by the spacing between conductors and determines the amount of delay.

Video amplifier 13 amplifies the compressed pulses which are then applied to a square law detector 22. Detector 22 which can be a conventional tunnel diode detector functions to rectify the pulses.

The detected echo or signal which is being processed has a duration of, for example, 3 to 200 nanoseconds. Thus, to effectively process the signal it is necessary to stretch the signal with respect to time. The required time stretching is accomplished by applying the rectified output of the detector 22 to the sampling oscilloscope 24 which operates in a well-known manner. The signal derived at the vertical output terminal 26 of the sampling oscilloscope is referred to as the signature waveform of the radar target producing the echo.

If the signature waveform voltage exceeds a predetermined value, a difference in voltage is developed by the threshold and pulse amplifier circuit 28. This voltage is amplified by the pulse amplifier portion of the threshold circuit 28. The peak detector 30 responds to the peak of the amplifier pulse output and produces a pulsing DC voltage. This pulsing DC voltage is filtered by the low-pass filter 32 to maintain system stability. Since the PIN diodes 16 require as much as 200 ma. for maximum attenuation, it is necessary to use a DC current amplifier 34.

Thus when the signature waveform voltage is above threshold level, current is driven into the PIN diodes 16, the signal power is attenuated, and the signature waveform voltage is decreased.

At the input of the sampling oscilloscope 24, the signal is a pulse with a duration of 3 to 200 nanoseconds. Using the sampling oscilloscope manual instructional and operational as a reference, the output time base is a direct function of the pulse repetition rate (PRF) of the received signal, the sampling rate per centimeter, and the time per centimeter sweep control. For example, with the controls set to 50 samples per centimeter, 20 nanoseconds per centimeter, and a PRF of 6.25 kHz., the vertical output of the sampling oscilloscope represents a signature repetition rate of 12.5 Hz. Thus the expanded target signature width can be as short as 1 microsecond for a point reflector to as long as 80 microseconds for a 100-foot target.

Operating the tunnel diode detector 22 at a power level of 0 dbm peak yields optimum detection performance. The signature waveform representing this power level has a peak voltage of 1 volt. If this peak voltage can be made not to exceed a given level slightly above 1 volt, for any signal strength, a voltage amplifier can be used to draw the recorder 25 to any level which is necessary.

A Fairchild semiconductor 709 integrated operational amplifier can be used in the threshold and pulse amplifier 28. This particular amplifier has sufficient bandwidth to yield a reasonable response to the energy pulse, and since it has a differential output, it is possible to implement the threshold pulse circuit with relative ease. The threshold circuit 28 is basically a voltage divider which allows a noninverted input (not shown) to be biased to a variable negative voltage. With less than the threshold voltage applied to the inverted input, the pulse amplifier 28 will saturate to −Vcc. If the voltage at the inverted input is equal to, or exceeds in magnitude the constant noninverted voltage, the amplifier will pass into its active region. An emitter-follower (not shown) can be used as the threshold input to prevent the sampling oscilloscope 24 from being loaded. The amplifier output will remain at approximately zero until the threshold level is exceeded. The difference between the input signal and the constant threshold voltage level will be amplified and will appear as a positive pulse.

It can be seen that a new and novel automatic gain control system for use with high-range-resolution radar receivers has been disclosed. The automatic gain control system normalizes signature waveform to a predetermined voltage level without distorting the echo signals with respect to shape or time. The radar receiver can be operated at its optimum signal level throughout the measuring range of the target. Furthermore, the requirement of manual control of the radar receiver gain is eliminated.

Obviously many modifications and variations of the present invention are possible in the light of the above teachings. It is therefore to be understood that within the scope of the appended claims the invention may be practiced otherwise than as specifically described.

I claim:

1. An automatic gain control system for high-range-resolution radar receivers comprising:
   a. means for receiving input radar chirp signals;
   b. microwave delay line means for time compressing said chirp signals into discrete pulses;
   c. square law detector means for rectifying said pulses;
   d. sampling means for stretching the rectified pulses with respect to time to thereby produce a signature waveform voltage;
   e. threshold means responsive to the amplitude of said signature waveform voltage to produce a voltage pulse when said amplitude exceeds a predetermined value;
   f. peak detector means responsive to the peak value of said voltage pulse to produce a pulsing DC voltage; and
   g. attenuator means responsive to said pulsing DC voltage to thereby attenuate said input radar chirp signals.

2. The system of claim 1 wherein said microwave delay line means for time compressing said chirp signals comprises a folded tape meander line.

3. The system of claim 1 wherein said sampling means comprises a sampling oscilloscope.

4. The system of claim 1 wherein said threshold means includes pulse amplifier means.

5. The system of claim 1 wherein said attenuator means comprise PIN diodes.

6. The system of claim 1 further including isolator means in series with said attenuator means.

7. The system of claim 1 further including low-pass filter means in series with said peak detector means.